Inventors
Joseph C. Rhodes
John P. Segers
Anthony V. Lacko
By Everett A. Johnson
Attorney Inventors
Joseph C. Rhodes
John P. Segers
Anthony V. Lacko
By Everett A. Johnson
Attorney

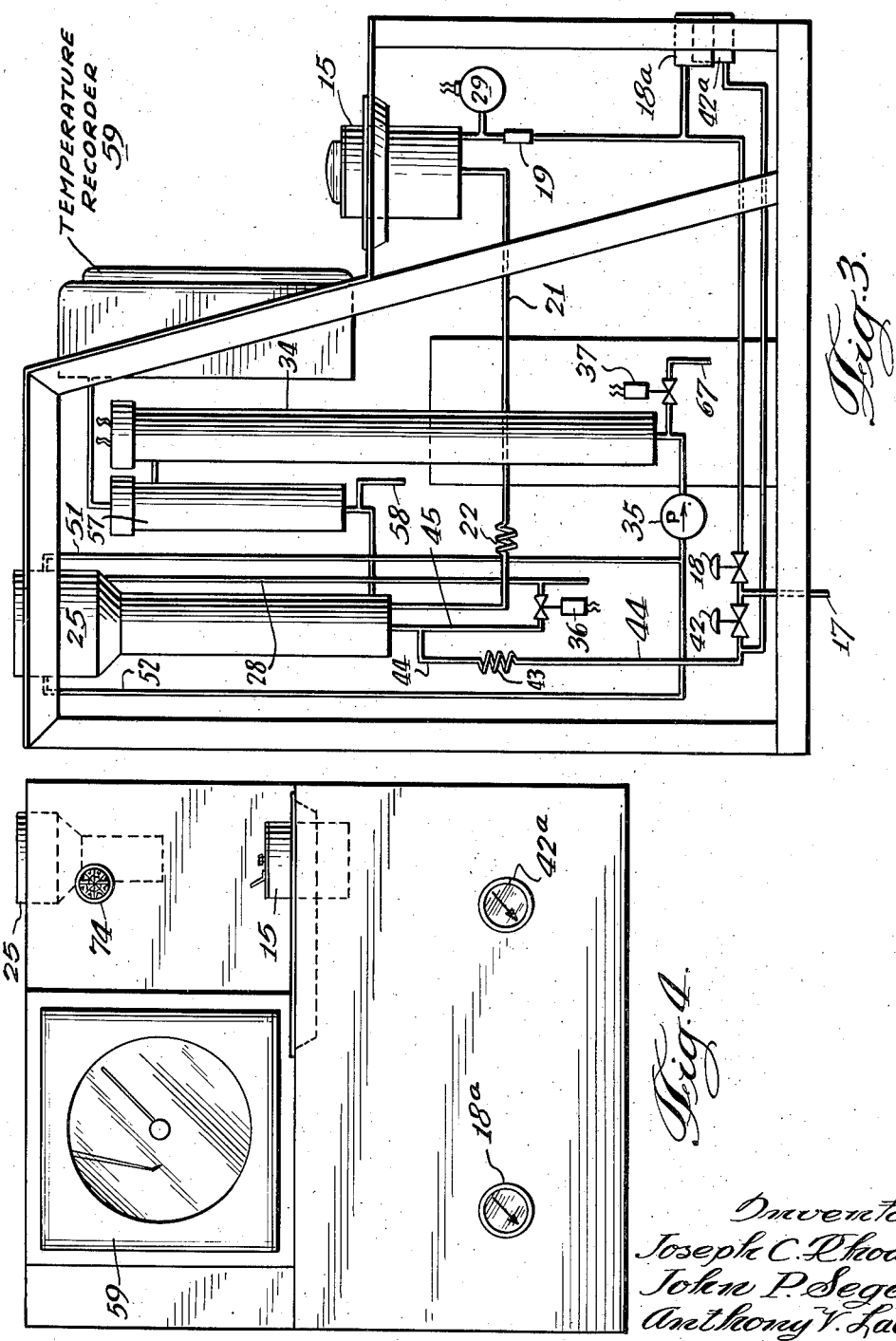

United States Patent Office 2,974,519
Patented Mar. 14, 1961

2,974,519

LABORATORY FLASH POINT TESTER

Joseph C. Rhodes, Park Forest, and John P. Segers, Crete, Ill., and Anthony V. Lacko, Gary, Ind., assignors to Standard Oil Company, Chicago, Ill., a corporation of Indiana Filed Nov. 30, 1956, Ser. No. 625,472

3 Claims. (Cl. 73—36)

This invention relates to the determination of the flash point of liquids. The invention more particularly relates to an improved apparatus for rapidly and conveniently determining and recording the flash temperature of hydrocarbon liquids in routine laboratory analyses.

In the production of certain commercial hydrocarbon products, it is desirable to maintain a flash point within specified limits in accordance to a prescribed specification. Heretofore, the flash point has been measured by one of the American Standard methods including the Tag Closed Cup, Pensky-Martens Closed Cup, and the Cleveland Open Cup. In each of these methods, the sample is heated at a prescribed rate and a test flame of precise size is inserted periodically into the vapor above the sample. The liquid temperature at which the vapor from the batch samples flashes is designated as the "flash point" of the hydrocarbon liquid under test.

Of the three standard flash point tests, the Pensky-Martens is the most rapid, but it sacrifices some accuracy and in many applications the slower Tag Closed Cup is specified. Nevertheless, even the fastest flash point test requires at least approximately ten minutes per sample and when maximum accuracy is desired the test takes even longer and about twenty minutes may be needed. In view of the long time necessary and the great care required for conducting the conventional methods for determination of flash point, it is not convenient to handle a large number of samples in the routine flash point analyses.

In a large petroleum laboratory, six to ten thousand flash point tests per month may be conducted and it is apparent that there is a great expenditure of skilled manpower when the tests are run on conventional apparatus.

It is, therefore, a primary object of this invention to provide a flash point indicating system which has an accuracy that is comparable to the best of the standard methods. A further object of the invention is to provide a flash point apparatus which is adapted for use in routine analysis of a large number of samples. Still another object of the invention is to provide a system which is fully automatic in its operation and which does not require an operator having technical skills. It is an additional object of this invention to provide such a system which requires a substantially shorter period of time for tests than the most rapid standard methods. A more specific object of the invention is to provide an electrical system for automatically determining and recording an indication of the flash point of bulk samples. A further object is to provide a reliable flash point instrument which does not require a precise measurement of the volume of sample and which can be operated with a minimum of attention. A further object of the invention is to provide means for automatically determining the flash point of a hydrocarbon liquid which is of simple and rugged construction and which yields results which are comparable to the values obtainable by one of the standard methods conventionally used. These and other objects of the invention will become apparent as the description thereof proceeds.

Briefly, according to our invention, we provide an apparatus wherein a sample is introduced into a self-contained metering device from which the sample is forced by displacement into a preheating coil and thence into a flash cup within a flash chamber. The sample is continuously drained from the flash chamber to maintain a uniform pool of liquid within the flash cup.

The sample is preheated by a hot water jacket which is connected in series with a pump, a heater and a temperature-sensing cell or chamber. The rate of hot water circulation and the construction of the preheater and jacket are such that the temperature of the oil in the preheat coil and the temperature of the circulated hot water is the same. A temperature measurement is, therefore, made on the hot water system as an indication of the oil temperature within the flash cup.

Air is metered into the sample within the flash cup at a fixed rate and a shield within the cup prevents splashing of the sample. The flash chamber is provided with two sparking electrodes above the sample cup and the upflowing air and evolved vapors pass the electrodes in being vented continuously from the flash chamber. Differential thermocouple means within the flash chamber and above the flash cup detects the occurrence of a flash, one of the thermocouples having a low mass and the other having a high mass so that a sudden increase in the temperature caused by an explosion in the flash chamber is detected.

When a flash occurs, solenoid-operated valves permit the withdrawal of the sample liquid from the sample cup and terminate the circulation of hot water while permitting the back flow of cold water through a temperature-sensing means. During this cooling period, the indicated temperature falls abruptly and the peak temperature recorded immediately prior to the cooling is the flash point of the sample.

Further details of our invention are illustrated by the accompanying drawings wherein:

Figure 3 is an elevation of the apparatus in a cabinet with a panel removed; and Figure 4 is a front view of the apparatus in Figure 3.

Figure 1:
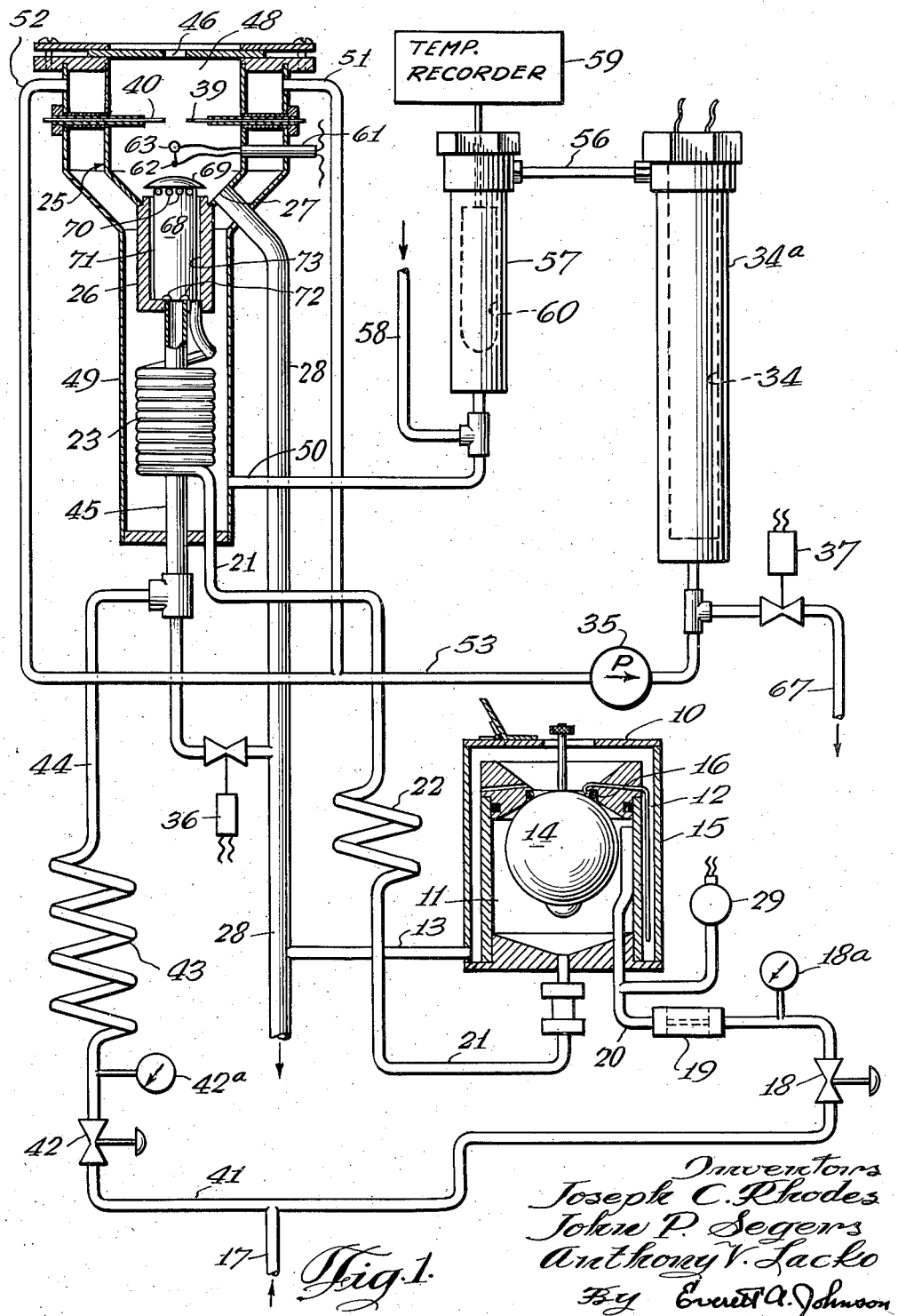
Figure 1 is an elevation schematically showing the general assembly of one embodiment of our invention.
Figure 2:
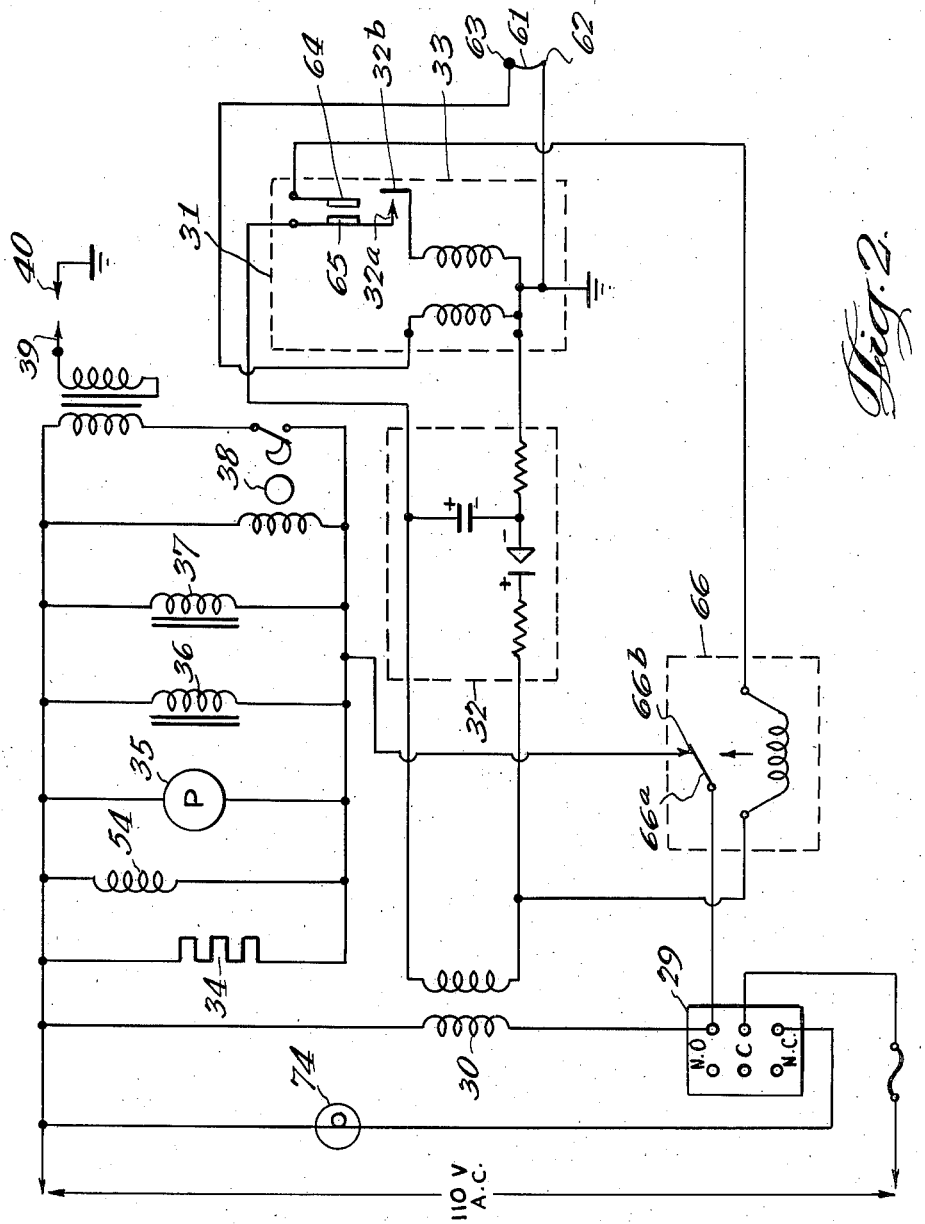
Figure 2 is a circuit diagram adapted for use with the apparatus of Figure 1.

Referring to the drawings, the sample is introduced into the instrument by lifting the cover 10 on the sample metering and feeding chamber 11 and pouring the sample into the cup to overflowing. Excess sample is syphoned from the cup via line 12 into the overflow drain 13. A float 14 in the sample feeding cup 15 is seated on an O ring 16 by the buoyant pressure of the sample. Air is bled into the feeding cup 15 from an air supply line 17 through a pressure regulator 18, a small capillary 19 and air inlet line 20. A pressure gauge 18a may be provided on line 20.

The increase in pressure within the sample cup 15 seats the float 14 and forces the sample from the sample cup 15 while maintaining the float 14 seated on the O ring 16. The sample is forced by the flow of displacing air through line 21 and capillary 22 at a uniform rate into the preheater coil 23. Further details of the sample metering and feeding apparatus are given in our co-pending application Serial No. 556,177, filed December 29, 1955, now Patent No. 2,859,620 entitled "Automatic Constant Rate Sample Feeder," and of which this application is a continuation-in-part.

During the test, the pressure on the inside of the sample feeding chamber 15 is about 10 p.s.i.g. and the sample flow rate therefrom is controlled at about 30 cc. per minute by the restrictive capillary 22 which is about 3 inches long with an inside diameter of about .031 inch. From the capillary 22, the sample passes into the preheater coil 23 which may, for example, comprise a four foot length of ⅛ inch tubing. From the preheater coil 23 the sample passes into the flash test chamber 25 including the flash cup 26 from which the sample flows through an overflow line 27 connected to the drain line 28.

A pressure switch 29 is in communication with the sample feeding chamber 15. As the pressure increases in the feeding chamber 15, the pressure switch 29 is actuated to energize the isolation transformer 30 and provide an A.C. voltage source to rectifier 32 which supplies D.C. booster current for sensitive relay 31 through coil 33.

The relay 31 is locked by the D.C. booster current supplied by rectifier 32 when the contacts 32a—32b are closed. The booster current also supplies sufficient torque in coil 33 to close the heavy duty contacts 64—65. The relay 31 can be unlocked by breaking the booster current and this is done automatically at the end of a test when the pressure inside meter chamber 15 is relieved and pressure switch 29 is deactuated.

When the pressure switch 29 is actuated at the beginning of a run, it also supplies power to closed contacts 66a—66b of heavy duty relay 66 and thus to the jacket of heater 34, a water circulating pump 35, oil drain solenoid valve 36, recorder chart drive motor 54, water backflow solenoid valve 37 and to the electrical sparker 38 controlling the electrodes 39 and 40.

Combustion air from air supply line 41 is bubbled into the liquid sample through the bottom of the flash cup 26 at the rate of about 800 cc. per minute. The air enters the system via pressure regulator 42, capillary 43, line 44, and oil drain line 45 having solenoid 36 below the line 45 merging with drain line 28. A pressure gauge 42a may be provided on line 44.

As the heating in the preheater coil 23 proceeds, an air-vapor mixture is formed within the flash test chamber 25 and vents therefrom through the vent port 46 in the top wall 47 of the flash chamber 25. The mixture is exposed to an intermittent electrical spark between electrodes 39 and 40 near the center of the vapor space 48 within the flash test chamber 25. The duration of the spark is about 0.1 second and its frequency is about once per second.

The flash test chamber 25 and the preheater coil 23 are surrounded by a jacket 49 having an inlet 50, a pair of outlet lines 51 and 52 converging to form return line 53 on which electrically driven pump 35 takes suction. The pump 35 in turn circulates the water through the electrical heater 34, connecting line 56, and temperature bulb chamber 57 and thence to inlet 50. Accordingly, the jacket 49 is connected in series with the heater 34 and the pump 35. At the beginning of a test, the oil drain solenoid valve 36 and the water outlet solenoid valve 36 and the water outlet solenoid valve 37 are closed. The oil drain valve 36 prevents oil from draining from the bottom of the flash test cup 26 via line 45 and the water outlet valve 37 prevents the escape of water from the system (and hence prevents the introduction of cold water via supply line 58 until needed as described below).

During the time the two solenoid valves 36 and 37 are closed, the electrical heater 34 and the pump 35 are turned on. The pump 35 causes the water in the essentially closed system to circulate past the heater 34, through the test chamber and preheater jacket 49, and back to the pump 35.

The heater 34 raises the temperature of the water in the circulating system at the rate of about 35° F. per minute. The temperature of the circulating water is detected by a vapor tension temperature recorder 59, the sensing element of the recorder 59 being a bulb 60 placed in the cell 57 through which the circulating water passes. The indications of the recorder 59 lag the temperature of the water in the jacket 49 by about 4° F. and the temperature of the oil introduced into the flash cup 26 also lags the temperature of the water by about 4° F. so that the recorder 59 indicates the oil temperature quite accurately.

The sample feeding chamber 15 has a capacity of about 150 cc. of sample and the flow rate is about 30 cc. per minute so that about 5 minutes are required to exhaust the sample from the cup 15. The initial temperature of the oil supplied to the apparatus is at about 60° F. and the final temperature no more than about 160° F. Since the temperature rise is about 35° F. per minute, the flash point of the sample will be reached in less than 3 minutes. This allows at least 2 minutes for cooling (by flowing the cool tap water through the flash cup 26 as described below) which assures that the instrument will be cooled sufficiently before the next test is begun.

Initially, the test chamber 26 and the water in the jacket 49 are about 60° F., having been cooled by the passing of tap water through the water circulating system prior to the closing of the water solenoid valve 37. As the temperature rises, the air-vapor mixture in the test chamber 48 becomes richer and richer until it eventually reaches the lower explosive limit at which time it is ignited by a spark from electrodes 39 and 40 and a minor explosion occurs inside the test chamber 26. This explosion is detected by a differential thermocouple 61, one junction 62 having a small mass and thus a small heat capacity, the other junction having a large mass and thus a large heat capacity. For gradual temperature changes, such as the gradual increase in temperature of the air-vapor mixture during the period prior to the explosion, the two junctions 62 and 63 remain at approximately the same temperature but for sudden changes, such as the temperature change of the gases during the minor explosion, the temperature of the smaller junction 62 rises considerably above that of the larger junction 63. This temperature difference furnishes a small voltage from the differential thermocouple 61 and this voltage appears across coil 33a and actuates sensitive relay 31 whose contacts 32a—32b are closed and cause the booster current to flow through coil 33 and furnish enough torque to close and lock contacts 64—65. The voltage furnished by the differential thermocouple 61 corresponds to a temperature difference between junctions of about 200° F. and the sensitive relay 31 is designed to operate on a difference of about 50° F.

When the explosion occurs, the sensitive relay 31 and a heavy duty relay 66 operate and the following events take place: The heater 34 and circulating pump 35 are turned off, the sparking device 38 is turned off, and the two normally open solenoid valves 36 and 37 are de-energized thus causing them to open the oil drain 28 and the water outlet 67. One of these solenoid valves 37 allows cool tap water from inlet 58 to flush through the water circulating system and cools the test chamber 26, heater 34, temperature bulb chamber 57 and circulating pump 35. The other solenoid valve 36 communicates with the bottom of the test chamber 26 through conduit 45 and allows the chamber 26 to drain completely to prevent contamination of the next sample. (Both of these solenoid valves 36 and 37 are closed by the pressure switch 29 at the beginning of a test.)

The splash shield 68 is disposed within the flash cup 26 and comprises a closed cap 69, perforations 70 and cylindrical sleeve 71, the lower end of which rests on the bottom of the cup 26. A plurality of notches 72 permit the complete drainage of oil from the cup 26 as well as the annular space 73 between the sleeve 71 and the wall of the cup 26. In this connection, it will be noted that the preheater coil 23 discharges predominately into the interior of sleeve 71 and partially into the annular space 73.

When the oil is exhausted from the sample feeding cup 15, it is followed by compressed air which serves to force all the liquid from the feed line 21 and from the preheater coil 23. This liquid drains by gravity from the flash test cup 26 through the solenoid valve 36 and to a drain 28 thereby reducing contamination between samples. Since the initial temperature of the oil is about 60° F. and the minimum flash point measured by the instrument is about 80° F., a flushing period of at least 30 seconds is provided by the flow of new sample through line 21, preheater 23 and cup 26 at the beginning of each test which further reduces contamination.

When the air pressure in the feed chamber 15 is sufficiently relieved by the air passing through the sample capillary 22, the pressure switch 29 breaks the booster current from 32 to reset the relay 31 which is used to detect the occurrence of a flash. A green light 74 indicates that the instrument is ready for the next flash point test. The float 14 falls by gravity from its seat 16 and another sample can be poured into the instrument.

From the above, it will be apparent that we have attained the objects of our invention by providing an apparatus which includes a differential thermocouple with one small mass junction and one large mass junction in association with a self-locking sensitive relay to detect a flash and interrupt the testing. Means is provided for heating the flash test chamber uniformly to prevent condensation of the vapors from the air-vapor mixture. In addition, means are provided for purging the sample from the feed lines, the preheat coil and the flash test chamber by displacement with the next succeeding sample so as to prevent erroneous flash indications due to contamination.

Although our invention has been described in terms of a preferred embodiment of the apparatus, it should be understood that this is by way of illustration and that the invention is not necessarily limited thereto. Alternative apparatus components and operating techniques will become apparent to those skilled in the art in view of our invention. Accordingly, modifications are contemplated without departing from the spirit of the invention.

What we claim is:

1. In an apparatus for rapidly determining the flash point of batch samples, the improvement which comprises a flash chamber of low heat capacity, a sample inlet in a lower portion of said flash chamber, an overflow outlet conduit means from an intermediate portion of said flash chamber, means for supplying combustion air to said flash chamber, vapor vent means from an upper portion of said flash chamber, preheater means for a sample under test, drain valve means connected to a lower portion of said flash chamber, jacket means about said flash chamber and said preheater means, a heat exchange liquid circulating system including said jacket means and adapted to raise the temperature of a sample in said flash chamber, ignition means within said flash chamber, means responsive to the occurrence of a flash in said chamber comprising a differential thermocouple including one couple of high mass and one of low mass and a sensitive relay means, control means actuated by a signal from said flash responsive means to introduce a cooling liquid into said heat exchange system and to open said drain valve thereby cooling and draining the flash chamber in preparation for another sample, and means for continuously recording the temperature of the circulating liquid, the peak temperature of the circulating heat exchange liquid recorded in each test being a measure of the flash point of the sample under test.

2. An apparatus for the determination of flash point of liquids which comprises in combination sample metering-feeding means, said sample metering-feeding means including a sample chamber, a wide-mouthed inlet to said sample chamber, a seal about said inlet, a float adapted to close said inlet by contacting said seal, conduit means connected to said chamber for the delivery of the sample therefrom, and means for introducing displacement fluid into said chamber to force the sample therefrom and through said conduit means, flash chamber means, preheater means, said conduit means discharging into said preheater means and said preheater means discharging into said flash chamber means, jacket means about said preheater means and flash chamber means, pump means for pumping heat exchange fluid through said jacket means, heater means for heating the fluid circulated in said jacket means, means for recording the temperature of such fluid, relay means controlling said heater means, means for passing combustion air through said flash chamber means, spark ignition means within said flash chamber means, differential thermocouple means including one couple of low mass and one of high mass within the flash chamber means adapted to actuate said relay means upon the occurrence of a flash within said flash chamber means, means also controlled by said relay means for supplying relatively cold heat exchange fluid to said jacket means whereby the temperature of the circulating fluid is substantially and rapidly reduced upon the occurrence of a flash, and means recording the temperature of the circulating heat exchange fluid, the peak temperature of the heat exchange fluid recorded in each test being the flash point of the liquid under test.

3. In a flash testing apparatus the combination of a vented flash chamber, a sample cup within said chamber, a preheater coil, conduit means exterior of said chamber discharging through said preheater coil into said sample cup, normally closed valved drain line means connected to said cup, sample metering and feeding means, conduit means from said metering-feeding means to said preheater coil, heat exchanger jacket means about said flash chamber and said preheater coil, a circulating system flowing heat exchange fluid through said jacket means including a circulating pump, a heater, temperature responsive cell means, and conduit means for series flow through said pump, heater, cell, jacket means and pump, means for passing combustion air through said flash chamber, spark ignition means within said flash chamber, differential thermocouple means within said chamber for detecting the occurrence of a flash therein, said differential thermocouple means having a low mass junction and a high mass junction, relay means actuated by signals from said differential thermocouple means, the valve in said drain line means being opened by said relay means upon the occurrence of a flash, solenoid valve means in said circulating system also controlled by said relay means upon the occurrence of a flash whereby cooling fluid is introduced into the circulating system to reduce the temperature thereof, and means for recording the temperature of the heat exchange fluid, the peak temperature recorded being an indication of the flash point of the liquid under test.

References Cited in the file of this patent

UNITED STATES PATENTS

| | | |
|---|---|---|
| 1,583,600 | McBurney | May 4, 1926 |
| 2,054,120 | De Florez | Sept. 15, 1936 |
| 2,268,442 | Crawford | Dec. 30, 1941 |
| 2,660,883 | Wyczalek | Dec. 1, 1953 |
| 2,746,285 | Greanias | May 22, 1956 |
| 2,746,286 | Greanias et al. | May 22, 1956 |